(12) United States Patent
Federspiel et al.

(10) Patent No.: US 10,657,141 B2
(45) Date of Patent: May 19, 2020

(54) INTERACTIVE MESSAGING SYSTEM

(71) Applicant: DART Video Communications, Inc., Larchmont, NY (US)

(72) Inventors: Frederick J. Federspiel, Larchmont, NY (US); Howard Engelhart, Princeton, NJ (US); Stephen Cooney, Larchmont, NY (US)

(73) Assignee: DART Video Communications, Inc., Larchmont, NY (US)

( * ) Notice: Subject to any disclaimer, the term of this patent is extended or adjusted under 35 U.S.C. 154(b) by 115 days.

(21) Appl. No.: 15/787,594

(22) Filed: Oct. 18, 2017

(65) Prior Publication Data

US 2018/0107718 A1    Apr. 19, 2018

Related U.S. Application Data

(60) Provisional application No. 62/409,522, filed on Oct. 18, 2016.

(51) Int. Cl.
*G06F 16/28* (2019.01)
*G06F 16/738* (2019.01)
(Continued)

(52) U.S. Cl.
CPC ...... *G06F 16/24575* (2019.01); *G06F 16/252* (2019.01); *G06F 16/284* (2019.01); *G06F 16/739* (2019.01); *G06F 16/951* (2019.01); *G06F 21/6218* (2013.01); *G06Q 10/00* (2013.01); *G06Q 10/10* (2013.01);
(Continued)

(58) Field of Classification Search
USPC .......................................................... 707/769
See application file for complete search history.

(56) References Cited

U.S. PATENT DOCUMENTS 9,104,850 B1 *   8/2015   Braden ................... G06F 21/31
9,455,839 B2 *   9/2016   Conrad ................. H04L 9/3271
(Continued)

OTHER PUBLICATIONS

International Preliminary Report on Patentability of PCT/2017/057528, dated Dec. 20, 2018.
(Continued)

*Primary Examiner* — Kim T Nguyen
(74) *Attorney, Agent, or Firm* — Invention Mine LLC

(57) ABSTRACT

Systems and methods include a processor; a memory comprising computer code executed using the processor, in which computer code implements a relational database to provide access to private user profile and private user data from a private data area and determines an access privilege; a custom response and notification generator configured to use the user profile data to retrieve historical user-related data; a compiling engine to select information from the retrieved historical user-related data to determine a public information source, wherein the retrieved historical user-related data are determined from prior stored user-related; a data handler to retrieve, from the public information source, some publicly-accessible information; and a video combination engine to combine information from the relational database and the publicly-available information and create a video using extracted publicly-accessible information, the private user data and create a publicly-accessible link to display a video.

22 Claims, 6 Drawing Sheets

(51) Int. Cl.
  *G06F 16/2457* (2019.01)
  *G06F 21/62* (2013.01)
  *H04N 21/4788* (2011.01)
  *H04N 21/45* (2011.01)
  *H04W 4/14* (2009.01)
  *G06F 16/25* (2019.01)
  *G06F 16/951* (2019.01)
  *G06Q 99/00* (2006.01)
  *G06Q 50/16* (2012.01)
  *G06Q 10/10* (2012.01)
  *G06Q 10/00* (2012.01)

(52) U.S. Cl.
  CPC ............ *G06Q 50/16* (2013.01); *G06Q 99/00* (2013.01); *H04N 21/4532* (2013.01); *H04N 21/4788* (2013.01); *H04W 4/14* (2013.01)

(56) References Cited

U.S. PATENT DOCUMENTS

| | | | |
|---|---|---|---|
| 10,154,389 B2* | 12/2018 | Shan | H04W 4/21 |
| 2006/0287764 A1 | 12/2006 | Kraft | |
| 2007/0123280 A1 | 5/2007 | McGary | |
| 2008/0097767 A1 | 4/2008 | Milman | |
| 2010/0241652 A1* | 9/2010 | Fasihuddin | G06Q 10/10 |
| | | | 707/769 |
| 2012/0089635 A1* | 4/2012 | Elchik | G09B 5/06 |
| | | | 707/769 |
| 2013/0198788 A1* | 8/2013 | Barger | H04N 21/266 |
| | | | 725/93 |
| 2013/0332308 A1* | 12/2013 | Linden | G06Q 30/0631 |
| | | | 705/26.7 |
| 2014/0025499 A1 | 1/2014 | O'Donnell | |
| 2014/0280633 A1 | 9/2014 | Ravindran | |
| 2016/0021042 A1 | 1/2016 | Alfieri | |
| 2016/0180478 A1 | 6/2016 | Cunningham | |
| 2017/0034179 A1* | 2/2017 | Carames | H04L 63/10 |
| 2017/0364599 A1 | 12/2017 | Ohanyerenwa | |
| 2018/0167696 A1* | 6/2018 | Kitazato | G06F 13/00 |

OTHER PUBLICATIONS

Notification of Transmittal of the International Search Report and the Written Opinion of the International Searching Authority, or the Declaration, dated Jan. 22, 2018.

* cited by examiner

FIGURE 3A

Receive, at a server, a short-message service (SMS) text message, the SMS text message including a phone number associated with the SMS text message, and a message body  310

Search a database coupled to the server to retrieve stored data associated with the phone number associated with the SMS text message 320

Determine the message is from an unknown information requester if there is no phone number associated with the SMS text message 3202

Determine a probable information provider according to a last-in-time sent message if message is from an unknown information requester and forwarding according to a determined last-known information provider sender 3204

Perform a search of the received text message to located identifying characteristices of a known information provider if no last-in-time sent message locates an information provider 3204

Bundle the stored data with the message body of the SMS text message to create an enhanced message 330

Forward the enhanced message according to the determined information provider instructions 340

Transmit the enhanced message as an SMS text message to one or more information requesters based on predetermined criteria, the predetermined criteria identifying the one or more information requesters  350

INTERACTIVE MESSAGING SYSTEM

CROSS-REFERENCE TO RELATED APPLICATIONS

This application claims the benefit of U.S. Provisional Application No. 62/409,522 filed Oct. 18, 2016, entitled "AN INTERACTIVE MESSAGING SYSTEM", which is hereby incorporated by reference in its entirety.

FIELD OF EMBODIMENTS HEREIN

Embodiments herein relate generally to the field of interactive messaging.

BACKGROUND

The discussion below is merely provided for general background information and is not intended as an aid in determining the scope of the claimed subject matter.

Interactions between information providers and information seekers often require real-time responsiveness. As a result, information providers use the Internet, cellular services and other modalities to interact with information seekers to increase responsiveness and remain competitive. These interactions may include informational requests, responses to queries, and providing data to information seekers. One method of interacting includes text messaging and email messaging. An important aspect of responsiveness is the routing required for interactions. Newer modalities of interaction require newer systems and methods to accommodate the newer modalities. A simple phone call and written record of contacts is no longer sufficient to accommodate today's society. Even email correspondence is considered too slow in some industries. The type of correspondence required to be competitive not only includes responsive information over different modalities of interaction, but include enhanced communication capable of delivering timely enhanced information. As a result, there is a need for systems and methods that accounts for the type of responsiveness required to be competitive.

SUMMARY

A system includes, but is not limited to, a processor; a memory comprising computer code executed using the processor, in which computer code implements a relational database to provide access to at least one private user profile and private user data from a private data area and to determine at least an access privilege; a custom response and notification generator configured to use the user profile data to retrieve historical user-related data; a compiling engine to select information from the retrieved historical user-related data to determine at least one public information source, wherein the retrieved historical user-related data are determined from prior stored user-related; a data handler to retrieve, from the public information source, at least some publicly-accessible information; and a video combination engine to combine the information from the relational database and the publicly-available information and create a video using extracted publicly-accessible information, the private user data and create a publicly-accessible information link to display a video. Other system aspects are described in the claims, drawings, and text forming a part of the present disclosure.

A method includes, but is not limited to, receiving a request to access private user data stored in a relational database; determining an access privilege to provide access to a private user profile and the private user data; retrieving, using the private user profile, historical user-related data; selecting information from the retrieved historical user-related data to determine at least one public information source to access; extracting, via a data handler, from the public information source, at least some publicly-accessible information; combining via a video combination engine, the selected information from the relational database and at least some of the extracted publicly-accessible information to create a personalized video; and creating a publicly-accessible link to display the personalized video.

In one embodiment, the method includes, but is not limited to routing the link to the personalized video in response to the request.

In one embodiment, a method for an interactive messaging service includes receiving, at a server, a short-message service (SMS) text message, the SMS text message including metadata identifying a phone number associated with the SMS text message, and a message body; searching a database coupled to the server to retrieve one or more stored data associated with the phone number associated with the SMS text message; bundling the stored data with the message body of the SMS text message to create an enhanced message; and transmitting the enhanced message as an SMS text message to one or more information requesters based on predetermined criteria to identify the one or more information requesters.

In one embodiment, a system includes: a processor, a communications module coupled to the processor, the communications module sending and receiving short-message service (SMS) text messages, each of the SMS text messages including a phone number and a message body; a database coupled to the processor, the database storing data associated with the phone number associated with the SMS text messages; a compiling engine to select information from the database based on the phone number and create an enhanced responsive SMS text message.

In addition to the foregoing, other method aspects are described in the claims, drawings, and text forming a part of the present disclosure.

In one or more various aspects, related apparatus include but are not limited to circuitry and/or programming for effecting the herein referenced method aspects; the circuitry and/or programming can be virtually any combination of hardware, computer code, and/or firmware in one or more machines or article of manufacture configured to effect the herein referenced method aspects depending upon the design choices of the system designer.

BRIEF DESCRIPTION OF FIGURES

FIG. 3A illustrates a flow diagram of a method in accordance with an embodiment the present application.

DETAILED DESCRIPTION

Figure 1:
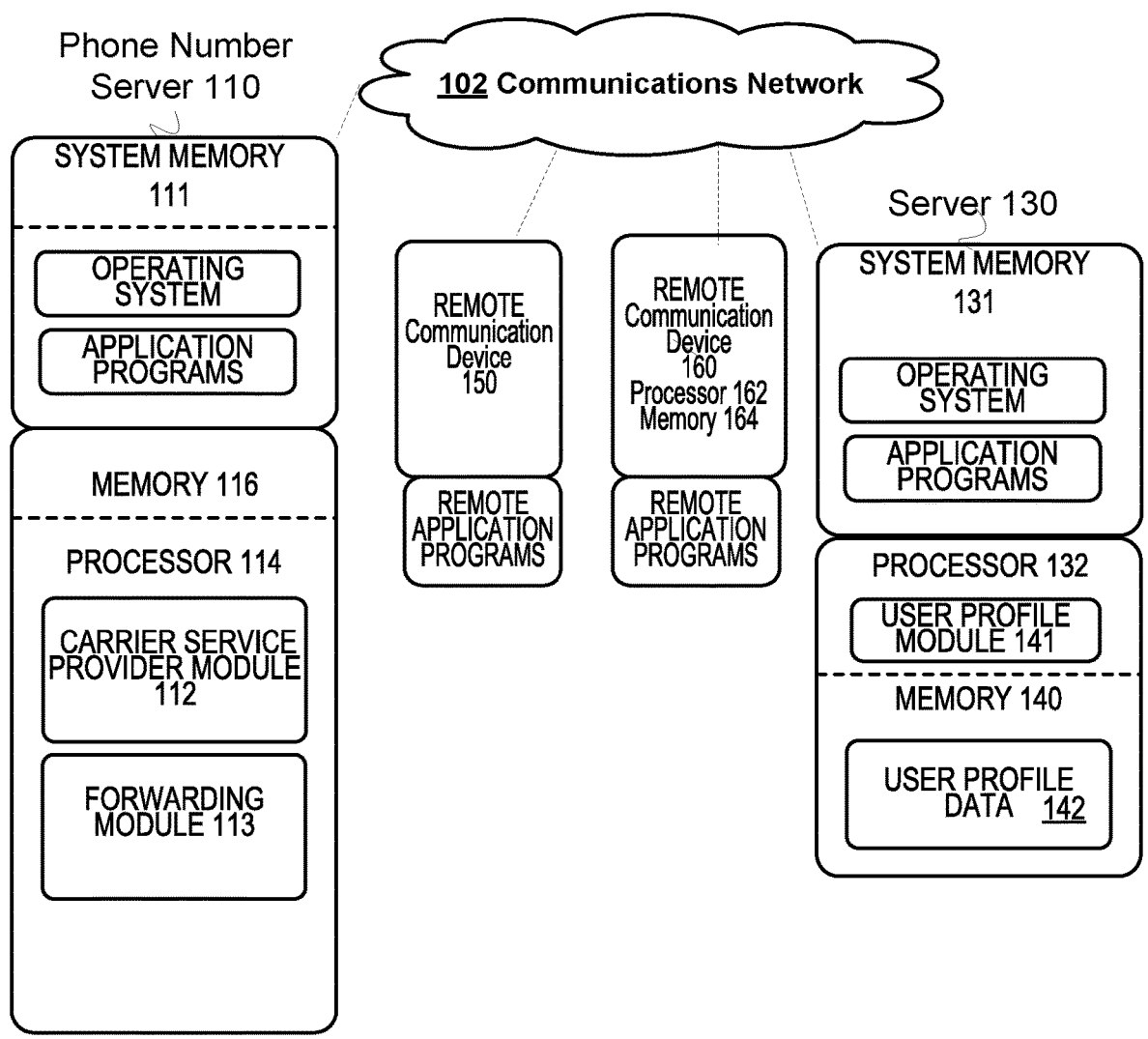
FIG. 1 illustrates an exemplary system implementing one or more embodiments in accordance with the present application.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Referring now to FIG. 1, one embodiment is directed to a system that enables enhanced responsiveness through interactive messaging. As shown, an interactive messaging system includes a communications network 102 enabling communications between phone number server 110 including a carrier service provider module 112 to enable receiving messages using different modalities, such as SMS text message, HTTP internet-based messages and the like. Phone number server 110 includes a system memory 111 including an operation system and application programs. Phone number server further includes processor 114. Processor 114 is shown coupled to memory 116. Processor 114 is shown including carrier service provider module 112, and forwarding module 113.

In one embodiment, phone number server 110 sends and receives text messages according to embodiments processes directed by modules, such as forwarding module 113 responsive to internal and external events as further described herein.

Phone number server 110 includes carrier service provider module 112 and forwarding module 113 enables a centralized number to be responsive to incoming and text messages and to forward information to another server or servers coupled to the phone number server 110. In one embodiment, phone number server 110 translates messages across a plurality communications protocols and modalities, such as between HTTP and SMS, to enable bi-directional messaging between other entities. For example, in one embodiment, phone number server 110 responds to Internet Protocols and enables communications to mobile devices over cellular networks. In one embodiment, phone number server 110 implements a phone service that performs the translation of messages and the bi-directional messaging between other software services, reachable via Internet Protocols to enable communication between information providers and information requesters using phones over common cellular networks. Thus, the phone number server 110 can be implemented on an internal network, or on external networks.

As shown, server 130 is coupled to phone number server 110 via communications network 102. Server 130 includes a processor 132 and memory 140. In one embodiment, server 130 is coupled to phone number server 110 via a network connection, such as via a cloud configuration. The network connection communications network 102 between server 110 and 130 and can be via intranet, internal network or over an external network. Communications network 102 can be a cloud network, local area network (LAN) or other network.

Server 130 is shown includes system memory 131 with an operating system and application programs. Server 130 further includes processor 132 including user profile module 141. Processor 132 interacts with memory 140. Memory 140 includes a user profile database 142, which holds user profile data. In one embodiment, user profile database 142 holds dimensional data in a dynamic relational database about users that can include information providers and information requesters. According to one embodiment, database 142 can hold names, phone numbers, email addresses and the like as well as transactional data, historical data and prior messages between information providers and information requesters.

In one embodiment, user profile data 142 is a dynamic relational database organized with one or more data structures. For example, relational database 142 can be organized to hierarchically store the private user data and public user data. User profile database 142, in one embodiment, includes a controlled-access hierarchical data component, the controlled access hierarchical data component including phone number routing information. In one embodiment, dynamic relational database 142 provides access to the at least one private user profile, such as an information provider's user profile and the private user data via the hierarchical data structure, the hierarchical data structure including at least one identifier associated with each private user profile, the at least one identifier enabling storing of one or more pre-identified messages. For example, the pre-identified messages can include messages between the private user and an information requester identified by the at least one identifier.

For example, a private user, in one embodiment, is an information provider operating remote communication device 150 storing private data to enable sending text messages via phone number server 110 to remote communication device 150 operated by an information requester.

FIG. 1 further illustrates remote communications device 150. Communications device 150 is can be communicatively coupled to phone number server 110 to send and receive text messages. In one embodiment, communications device 150 is a mobile device and represents a device of an information requester. For example, in one embodiment, an information requester can be a customer or potential customer.

Remote communication device 150 communicates with phone number server 110 via SMS text message or HTTP message or other type of modality to request information. In one embodiment communication device 150 is a smart phone or other enhanced communication device with a graphical user interface capable of displaying web pages, text messages and the like.

FIG. 1 further shows remote communication device 160, which is communicatively coupled to phone number server 110 via communications network. Communication device 160 includes processor 162 and memory 164 coupled to processor 162. Memory 164 optionally includes a user profile database accessible to the user of communication device 160. In one embodiment, communication device 160 represents a device of an information provider. For example, in one embodiment, an information provider can be a real estate agent or other real estate professional that provides information to potential customers, leads, and the like.

Both remote communication device 150 and remote communication device 160 include remote application programs to enable web browsing, and interactions with phone number server 110 and server 130.

In one embodiment, server 130 interacts with phone number server 110 to generate SMS text messages, to one or more communication devices 150 and 160 representing one or more information requesters, customers, leads, and the like, and information providers, agents, and users capable of remotely interacting with server 130. The SMS text messages sent to communication devices 150 are sent from a centralized phone number of phone number server 110. In one embodiment, phone number server 110 sends out machine-generated text message after receiving an indication to do so from communication device 160 or according to predetermined parameters, which request is associated with a phone number associated with communication device 160.

In one embodiment, after receiving an SMS text message from phone number server 110, if communication device 150 responds to the message with a responsive SMS text message, the response is received at phone number server 110, which forwards the message to server 130 for processing. Server 130, according to an embodiment, prepares a responsive communication either automatically or after communication with communication device 160.

Figure 2:
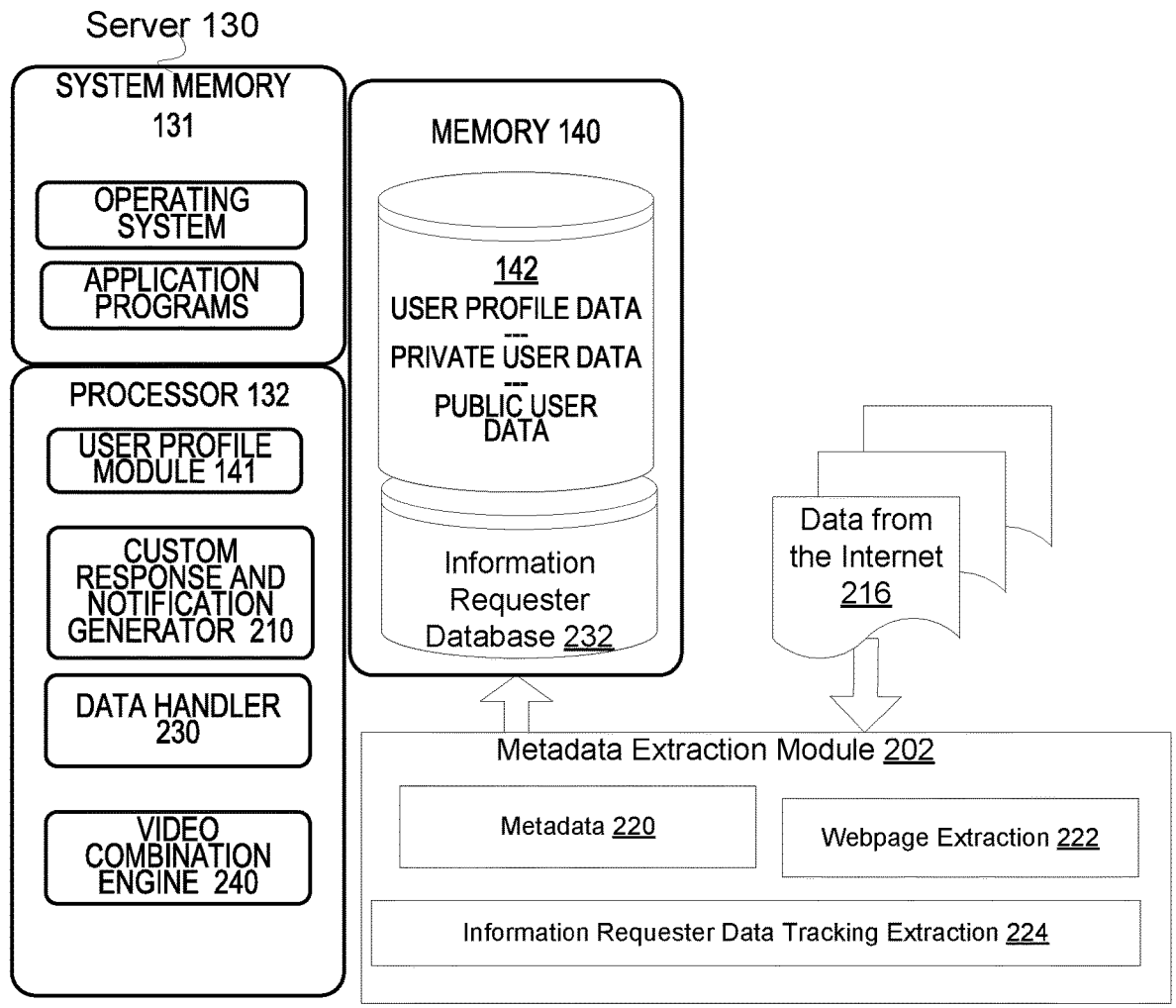
FIG. 2 illustrates a more detailed exemplary system implementing one or more embodiments in accordance with the present application.

Referring now to FIG. 2, server 130 is shown in further detail. As shown, according to an embodiment, server 130 includes system memory 131 with an operating system and application programs, and processor 132 and memory 140. Processor 132 includes user profile module 141, communications module 136. As shown, processor further includes custom response and notification generator 210, data handler 230 and video combination engine 240, each configured to interact with memory 140.

In one embodiment, custom response and notification generator 210 retrieves user profile data via user profile module 134 interacting with memory 140 to retrieve historical user-related data stored in database 142. Processor 132 further includes compiling engine 220 configured to select information from the retrieved historical user-related data. In one embodiment, compiling engine determines from the historical user-related data at least one public information source.

In one embodiment custom response and notification generator 210 determines an access privilege using database 142, private user data, and as a function of the access privilege, retrieves the historical user-related data in combination with one or more pre-identified messages. In one embodiment the pre-identified messages are received via phone server 110, routed from a remote communication device 150 or 160.

In one embodiment, custom response and notification generator 210 selects information from the retrieved historical user-related data to determine at least one public information source, wherein the retrieved historical user-related data are determined from prior stored user-related. For example, in one embodiment, in a real estate environment, a public information source can be a Multiple Listing Service (MLS) listing publicly available via one or more websites, such as Zillow™, Realtor.com™ and other websites publicly disclosing information about real estate markets. The retrieved historical user-related data can include real estate information of interest to the information requester such as property tax data, listings in given geographical area, square footage, number of bathrooms, number of bedrooms, price range of real estate, school data, criminal activity in a geographical area, recent sales, estimate of value of real estate listings, and the like.

Processor 132 further includes data handler 230 that works with custom response and notification generator 210 to retrieve, from the public information source, at least some publicly-accessible information, such as current real estate information. More particularly, as shown in FIG. 2, data from the internet 216 is retrieved, for example via phone number server 110 or via an internet connection to communications network 102 shown in FIG. 1. Data from the internet 216 can include website search results, SMS text messages, and metadata, tracked data from information requesters that access a URL associated with server 130 or the like.

Data from the Internet 216 is received at metadata extraction module 202 that enables server 130 to extract metadata from information received. Metadata extraction module 202 includes metadata extraction 220 that extracts phone numbers, identifiers such as names and other information. Webpage extraction 222 enables extraction of tracked webpage information, such as number of hits, properties of high interest and the like. Metadata extraction module 202 further includes information requester data tracking extraction 224, which can be implemented as an API to receive tracked data The information extracted can be stored as historical user profile data in relational database 142 and/or in information requester database 232. In one embodiment, information requester database 232 is used to store text messages, metadata related to an information requester or the like.

Processor 132 further includes video combination engine 240, which interacts with memory 140 and compiling engine 220 to combine information from the relational database and the publicly-accessible information and create a personalized video.

Memory 140 is shown including user profile database 142. In one embodiment, user profile database 142 includes private user data and public user data.

Referring now to FIG. 3A in combination with FIG. 1 and FIG. 2, a flow diagram 300 illustrates a method in accordance with an embodiment. As shown, block 310 provides for receiving, at a server, a short-message service (SMS) text message, the SMS text message including a phone number associated with the SMS text message, and a message body. For example, phone number server 110 or server 130 receives a text message directly or indirectly from either communications device 150 or 160.

Block 320 provides for searching a database coupled to the server to retrieve stored data associated with the phone number associated with the SMS text message. For example, server 110 or server 130 can be coupled to either an external database holding user-related data. In one embodiment, the database is relational database 142. The phone number associated with the SMS text message received will identify the SMS text message as either an information provider, an information requester or an unknown. More particularly, the database coupled to the server can organize phone numbers such that information providers are segregated from information requesters and unknown phone numbers. In one embodiment, information providers have similar phone numbers, extensions, or identifiable number combinations to enable the relational database to quickly identify information providers and store associated data.

Block 320 includes block 3202, which provides that if there is no phone number associated with the SMS text message, determining that the message is from an unknown information requester. If the message is from an unknown information requester, block 3204 provides, according to one embodiment, phone number server 110 determines a probable information provider/agent according to a last-in-time sent message.

In one embodiment, block 3206 provides that if no last-known sender is determined, a search of the received text message is performed to locate identifying characteristics of a known information provider. For example, in one embodiment, the custom response engine 210 searches metadata associated with the received text message, including message body to locate tags, fields or other indicia of identification such as a name, performs a global search of the relational database 142 to find a match, and choses an information provider with a closest match.

In one embodiment, block 3208 provides for waiting a period of time, for example a second or more to allow for a human response time by an information requester/customer. According to this embodiment, server 130 or 110 performs a search to identify the information provider/agent that sent the most recent message to the sender of the text message, but ignores any messages sent during a designated time. For example, of all messages sent to a particular information requester/customer, a Boolean function, such as an XOR or AND NOT can be performed to identify only messages sent to the information requester/customer sent during a particular time frame, date period, or the like. Such a filter enables server 130 to ignore pre-identified broadcast messages sent by server 110 or server 130 during an identified time period.

Block 330 provides for bundling the stored data with the message body of the SMS text message to create an enhanced message. For example, in one embodiment, the bundling stored data can include bundling prior interactions into a message. That message can be forwarded.

Block 340 provides for forwarding according to the determined information provider instructions. For example, server 130 using phone number server 110 can forward a text message to an information provider. In one embodiment, if the determined information provider has a protocol in place to automatically respond to information requesters that are pre-identified, a text message can automatically be sent. In another embodiment, information provider can interact with the information requester directly.

If the information provider has instructions in place, block 350 provides for transmitting the enhanced message as an SMS text message to one or more information requesters based on predetermined criteria, the predetermined criteria identifying the one or more information requesters. For example, if the SMS text message is determined to be from an agent to a centralized phone number or a phone number associated with phone number server 110, the text message could include instructions for indicating responsive SMS text messages. More particularly, in one embodiment, if a received SMS text message is from an information provider, the phone number would indicate as such. Text messages from information providers, in one embodiment, are automatically directed to a metadata search module that pulls instructions from the message body. For example, if an information provider is a real estate agent who wants to broadcast a message to a plurality of real estate customers, the message could include a plurality of phone numbers of information requesters/customers and instructions to broadcast an identified property for sale or other identified message to the plurality of phone numbers.

In one embodiment, if the SMS text message is determined to be from an information provider/agent, phone number server 110 automatically forwards the message for processing to server 130. Server 130 processes the message by performing a search using custom response and notification generator 210 to identify prior messages sent to the information provider/agent by an information requester/customer. Custom response and notification generator 210 can then determine whether a particular information requester/customer has previously received text messages from the identified information provider/agent, and determine whether to send a custom response to the identified information requester/customer or to send a failure message back to the information provider/agent. In one embodiment, the failure message can include a clarification request to give the information provider/agent an opportunity to identify a phone number or other identifying information for an information requester/customer.

In another embodiment, the transmitting the enhanced message as an SMS text message to the one or more information requesters can include determining that the SMS text message is not from an agent/information provider. In such a case, a search of the relational database 142 can determine whether the phone number is associated with a pre-existing information requester phone number. If the sender is determined to be an information requester/customer, an enhanced responsive text message can be created that includes the bundled data from prior interactions. In one embodiment, any message received that is determined to be from an information requester/customer via a stored phone number, instantiates a responsive text message directed to an associated information provider/agent. More particularly, in one embodiment, the relational database includes, for each information requester, a phone number stored, and one or more information provider phone numbers for forwarding purposes.

In one embodiment, if the responsive text is to an associated information provider, such as a real estate agent, the responsive text can include the information requester/customer phone number and name, and optionally other identifying information, such as email address, or a list of properties that the information requester has previously investigated, or a list of previous communications from that information requester. In one embodiment, the received SMS text message body, together with metadata, can be packaged into a single text message. The enhanced responsive text message, in one embodiment, is forwarded to one or more information providers/agents to enable the information provider/agent to directly respond to the information requester/customer. In one embodiment, either phone number server 110 or server 130 forwards the enhanced responsive text message.

In one embodiment, received text messages from information requesters/customers that are identified as associated with a particular information provider/agent are automatically responded to as if from the associated information provider/agent. In this embodiment, the automated response is developed from metadata derived from a search of the relational database 142 for data associated with the information provider/agent phone number. For example, as shown in FIG. 2, metadata extraction module 202 providing information to information requester database 232 can enable metadata embedded in the enhanced reply message to the information requester/customer can include the information provider/agent phone number and name, and email address, and other information pre-chosen by the information provider/agent. The message body (which can include an information provider's/agent's reply) together with configured metadata, can be packaged into a single text message which is forwarded via server 130 to the information requester/customer by phone number server 110.

Figure 3B:
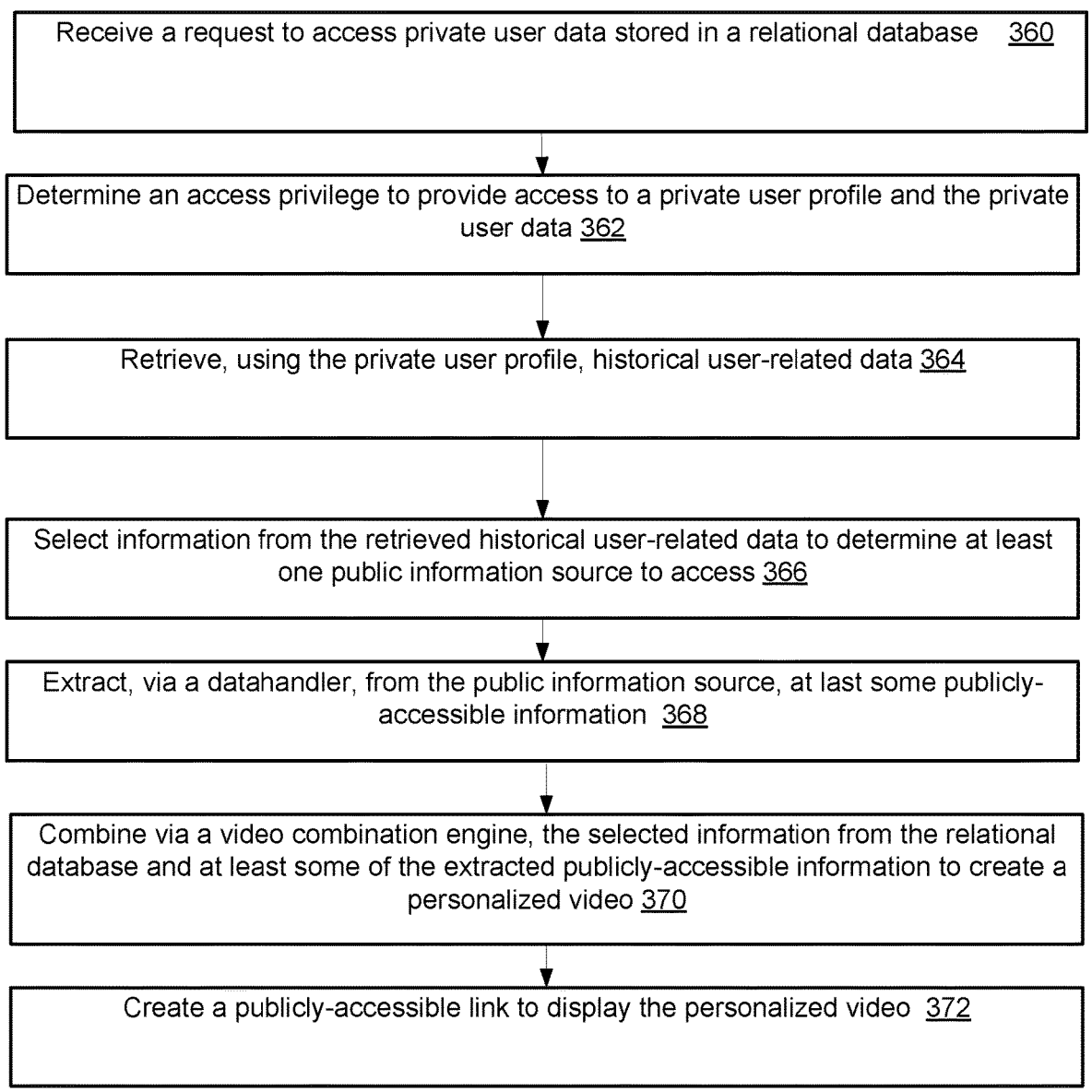
FIG. 3B illustrates another flow diagram of a method in accordance with an embodiment of the present application.

In one embodiment, if a database such database 142 or information requester database 232 fails to determine one or more information provider phone numbers, the responsive text message will automatically send an error message to the information requester indicating a failure to process a reply Referring now to FIG. 3B in combination with FIG. 1 and FIG. 2, a flow diagram illustrates a method in accordance with an embodiment. Block 360 provides for receiving a request to access private user data stored in a relational database. For example, a request can be in a form of a text message or a direct access request from an information provider, such as a real estate agent. Block 362 provides for determining an access privilege to provide access to a private user profile and the private user data. Referring to FIG. 2, the text message can include a user information provider accessing private user data via database 142 or the like. Block 364 provides for retrieving, using the private user profile, historical user-related data. For example, FIG. 2 illustrates memory 140 including information requester database 232, and database 142 including private user data and public user data and user profile data. Block 366 provides for selecting information from the retrieved historical user-related data to determine at least one public information source to access. For example, in one embodiment, historical user-related data can include private user data or public user data stored in database 142. Block 368 provides for extracting, via a data handler, from the public information source, at least some publicly-accessible information. For example, data handler 230 can extract via metadata extraction module 202 and webpage extraction module 222 information about real estate listings, property tax information and the like. Block 370 provides for combining via a video combination engine, the selected information from the relational database and at least some of the extracted publicly-accessible information to create a personalized video. For example, video combination engine 240 can combine information from database 142, 232, or metadata database 220. Block 372 provides for creating a publicly-accessible link to display the personalized video. For example, a link, such as a URL address can enable access to server 130 to play a video created by video combination engine 240.

In one embodiment, database 142 includes a hierarchical data structure, the hierarchical data structure including at least one identifier associated with each private user profile, the at least one identifier to database storing one or more pre-identified messages. The pre-identified messages can be text messages sent to and from an information provider and an information requester.

The hierarchical data structure can provide controlled access to a hierarchical data component including phone number routing information.

Database 142 can include a dynamic relational database that provides access to the at least one private user profile and the private user data via a hierarchical data structure, the hierarchical data structure including at least one identifier, such as a phone number, associated with each private user profile, the at least one identifier to database storing one or more pre-identified messages. Thus, the pre-identified messages can include messages between the private user and a customer identified by a phone number.

In one embodiment, the custom response and notification generator determines the access privilege, and as a function of the access privilege, and retrieves the historical user-related data, such as located in metadata 220 and in information requester database 232 in combination with one or more pre-identified messages.

In one embodiment, custom response and notification generator 210 selects information from the retrieved historical user-related data from database 142 to determine at least one public information source, wherein the retrieved historical user-related data are determined from prior stored user-related data.

Figure 4:
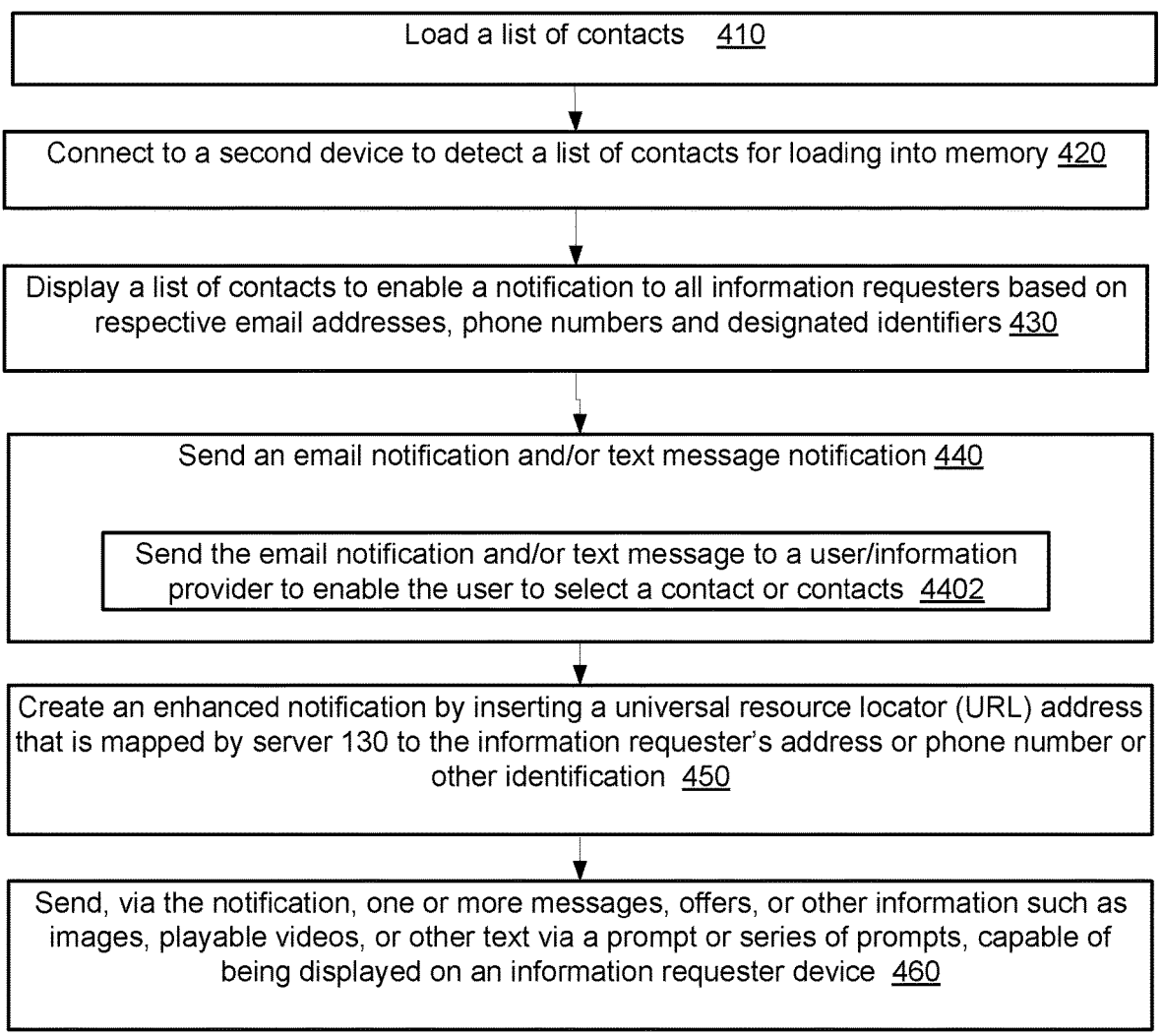
FIG. 4 illustrates a flow diagram of a method in accordance with an embodiment the present application.

Referring now to FIG. 4, one embodiment is directed to a method for creating and operating the user profile database located in memory 140 of server 130.

Block 410 provides for loading a list of contacts. For example, user profile database 142 can be formed via loading a list of contacts directly in the server 130's memory 140. Block 420 provides for detecting contacts by email address, phone number, or by other types of identification.

Block 420 provides for connecting to a second device, such as communication device 150 and detecting a list of contacts for loading into memory 140.

Block 430 provides for enabling a display of the list of contacts to enable a notification to be sent to all of the information requesters based on the respective email addresses, phone numbers, and designated identifiers.

Block 440 provides for sending an email notification and/or a text message notification. In another embodiment, block 4402 provides for sending a notification to a user/information provider to enable the user to select a contact. For example, server 130 can send a notification to a user device, such as communication device 160 to select one or more of the contacts to enable a text or email notification to be sent to the selected information requesters.

Block 450 provides for creating an enhanced notification by inserting a universal resource locator (URL) address that is mapped by server 130 to the information requester's address or phone number or other identification. The URL enables the corresponding web page associated with the URL address at server 130 to display a personalized message, offer, or other information based on the individual information requester.

Block 460 provides for sending via the notification, one or more of messages, offers, or other information such as images, playable videos, or other text via a prompt or series of prompts, capable of being displayed on an information requester device, such as communication device 160 after accessing the notification. Communication device 160 can display different webpages or styles of webpages based on the selection of the types of information that is requested or the particular subject matter of the notification. Certain characteristics of the images and videos displayed on the webpage can be determined based on a particular input or pre-determined parameters.

In one embodiment, user profile module 134 interacts with user provide database 142, compiling engine 220, data handler 230 and video combination engine 240 to transmit messages that include alerts for a sale tailored for a specific group of items or properties. Specifically, server 130, prepares messages for sending to different contacts.

In one embodiment, the alert for the sale or offer for a sale of a commercial item or property, an update of a particular business market. In one embodiment, the displayed information or subject matter can be tailored to include only a single business market or multiple businesses. In another embodiment, the displayed information or subject matter is tailored to a particular geographical location. In other embodiments, the displayed information or subject matter is an alert for a sale or offer of a sale for multiple commercial items or properties. The alert can include displayed information and subject matter selected by a predetermined price range. In other embodiments, subject matter of an alert is selected by specifying certain characteristics of the desired commercial item or property, such as color, size, shape, or condition.

In other embodiments, a combination of parameters is specified to narrowly tailor an alert. In some embodiments, these parameters are selected via a graphical user interface executing on communication device 150. In other embodiments, these parameters are selected on the webpage that is displayed to the information requester of the notification via communication device 160, for example, based on the information requester's history or browsing habits as recorded in metadata 220.

In one embodiment, the compiling engine 220, data handler 230 and video combination engine 240 work with custom response and notification generator 210 executing on the server 130 to send notifications to information requesters at pre-determined times. In other embodiments, server 130 is configured to send notifications/alerts to information requesters at a pre-determined frequency. In some embodiments, these pre-determined times and frequencies are altered in a screen displayed by the via a graphical user interface executing on either server 130 or on a communication device, such as communication device 160 networked to server 130. In other embodiments, the pre-determined times and frequencies can be altered in the displayed webpage that is sent via URL address to the information requester. In some embodiments, the notifications are sent to information requesters when a certain event occurs. In some embodiments, this event is the sale of a commercial item or property, or the announcement of the availability of a commercial item or property for sale. In other embodiments, this event is a promotional offer. In other embodiments, the event is an informational message or advertisement. In some embodiments, the event is triggered at a pre-determined time or frequency or based on the selected parameters. In other embodiments, the server 130 is configured to send a notification when a particular command or prompt is entered.

In another embodiment, adjusting the timing and frequency of the notifications/alerts is based on the information requester's history of activity and browsing habits. More particularly, referring to FIG. 5, in one embodiment, the requesters history of activity and browsing habits is collected by collecting metadata.

Figure 5:
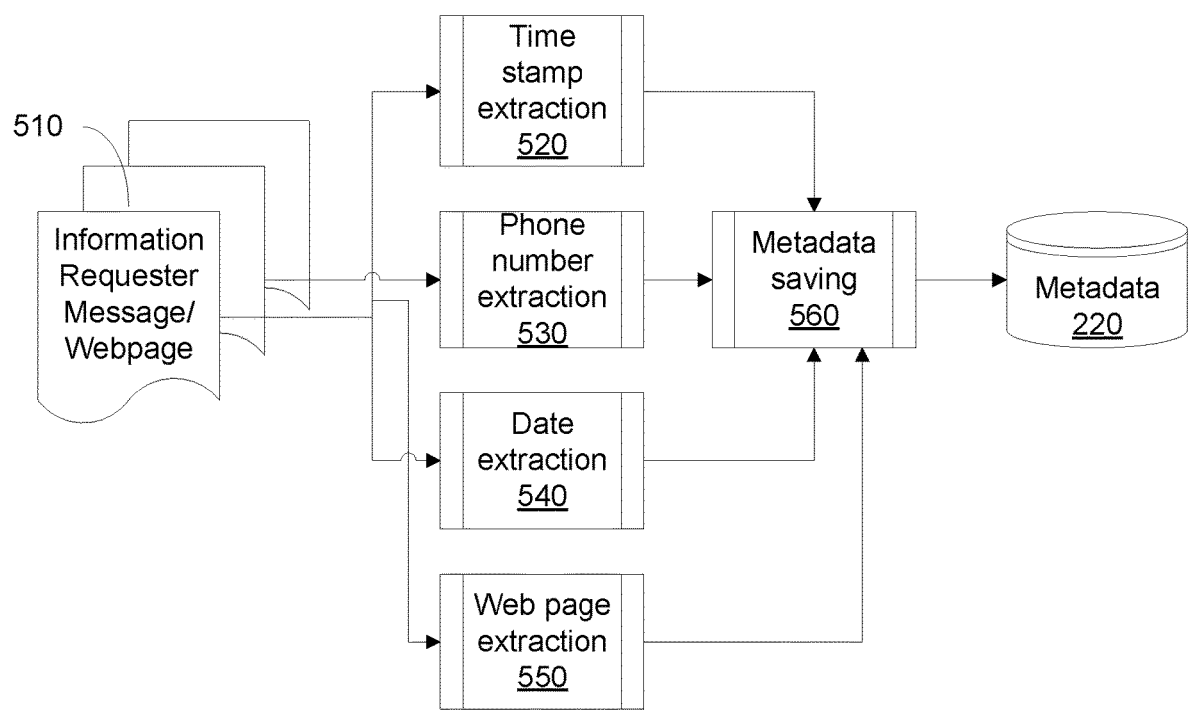
FIG. 5 illustrates a data flow diagram in accordance with an embodiment of the present application.

As shown in FIG. 5, in one embodiment, a requester sends a message or visits a webpage that results in an opportunity for metadata collection. Data 510 represents information requesters message or webpage visited. In accordance with an embodiment, metadata present via the visiting the webpage, sending a message or having javascript running on an information requester's communication device results in collection of metadata. Thus, as shown, based on the message/webpage, information can include time stamp extraction 520, phone number extraction 530, date extraction 540, and/or webpage extraction 550. This data can be combined into metadata saving 560 and sent to a metadata database 220, that can be part of server 130. Once metadata 570 is stored in server 130, that are information requester specific, metadata 570 can incorporate the information to enable enhanced responsive messages. In one embodiment, metadata database 220 is operably coupled to user profile database 142.

Referring back to FIG. 2, User Feedback Database 232 can include metadata pulled from metadata database 570 or directly tracked data via an application programming interface (API) or other method of tracking actions taken by an information requester. In one embodiment, data is received directly from an information requester when the information requester opens a webpage sent via text message URL or other modality. For example, java script instantiated on an information requester's device can include the following script:

```
ExtPlayerController.prototype.onViewInit = function( ) {
  var self = this;
  this.reportAction({action: 'open', data : this.sourceProperty });
  if (this.autoPlay) {
    this.view.showVideo( );
  } else {
    this.view.showCTA('skip');
```

The reportAction method in java script sends the actions performed by the information requester to a tracking API along with some associated metadata such as metadata database 220. In one embodiment the API request is handled by server 130 and results in the activity being recorded in metadata 220. A sample code used to load metadata 220 as shown in FIG. 5 is as follows:

```
INSERT INTO
actions (vCode,theDate,theAction,contactID,
user_id,property_id,comm,viewer)
  VALUES
($insVCode,NOW( ),'$action',$insContact,$user_id,
$insProp,$insComm,$insViewer);
```

Referring back to FIGS. 1 and 2, in one embodiment, after than collecting metadata actions taken by an information requester, In another embodiment, the server 130 tracks and store an information requester's web-browsing habits, such as particular URL addresses visited or frequented, or particular phrases or subject matter searched for by a information requester. In such an embodiment, server 130 receives metadata from one or more messages received from communication devices 150 or from server 110 or the like and compares the identified users in user profile database for searched subject matter, history, and habits with subject matter or events already stored in the server 130, memory 140. Any matching subject matter or event triggers server 130 to assemble a playable video, webpage, or other notification for communication to the identified information requestor/customer regarding events or similar subject matter.

In another embodiment, server 130 is responsive to communications from communication device 150, 160 that indicate a direction to assemble a playable video, webpage, or other notification for communication to an information requestor/customer regarding the event or similar subject matter.

In one embodiment, when an information requester using communication device 150 views a webpage via a URL associated with server 130, server 130 receives via data from the internet 216 or via a text message through phone number server 110, and server 130 detects an event or subject matter of interest to an identified information requester based on information requester database 232, an alert is sent via custom response and notification generator 210.

According to an embodiment, custom response and notification generator 210 in combination with user profile module 141 determines, based on the profile data, that server 130 should send out a notification to an information requester regarding the particular event or subject matter. In one embodiment, the server 130 is configured to assemble via video combination engine 240, a playable video or image or message in connection with the specific event or subject matter that caused the alert to be sent from server 130. In this embodiment, the server 130 is configured to transform the playable video or image or message into a URL address, which is then sent to the information requester as a notification. In another embodiment, the playable video is assembled by piecing together a number of video templates or components already stored in the server 130's memory 140.

In one embodiment, server 130 using video combination engine 240 is configured to assemble playable videos based on an information requester's predetermined parameters for receiving notifications. In another embodiment, the server 130 is configured to also assemble playable videos based on the information requester's playable video watching habits and history. The assembled videos can be formed and stored with a URL address stored on server 130, which URL is sent via phone number server 110 to one or more information requesters.

In another embodiment, the phone number server 110 is configured to receive an input command via a text message from an information requester over remote communication device 150 to send an alert to the server 130 to trigger a notification. In other embodiments, the server 130 is configured to directly receive an input command to send out the alert to an information requester. The input commands are specifically tailored to the information requester based on pre-determined parameters such as a particular event or subject matter. In other embodiments, the input command includes a promotion or other message based on the information requester's pre-determined parameters for receiving notifications.

In one embodiment, the text message includes information related to the occurrence of a specific event that is pre-determined. In other embodiments, the text message includes promotional information or an offer that was input via a command to either the first or second computer code. In one embodiment, the text message includes a URL address that is linked to a webpage. In other embodiments, the URL address links to a playable video. In yet other embodiments, the URL address links to an image.

In one embodiment, the server 130 is configured to track via tracking enabled on a remote communication device 150 or 160 the number of times a particular URL address has been clicked. Server 130 is further configured to store the number of clicks in its memory to be later recalled. In another embodiment, server 130 is further configured to track how many unique information requesters have clicked or use a particular URL address. The tracking can be stored in metadata database 220.

In one embodiment, the URL address sent to an information requester links to a playable video. The server 130 is configured to assemble the playable videos via video. The server 130 is further configured to store multiple templates and components for use in assembling the playable videos. These templates and components include animations, on-camera footage of an individual speaking or performing a particular act, video footage of a particular commercial item or property, video footage of a geographical location, a photograph or a series of photographs played in succession, data displayed via text, data displayed via an image or graphics, data displayed via text in association with a video, background music, or an individual speaking a particular phrase or describing something or offering a greeting.

In one embodiment, the URL address links to a playable video or webpage that includes music. In another embodiment, the server 130 is configured to play music based upon a specific information requester's pre-determined parameters or history or habits stored in user profile database 142. In another embodiment, server 130 is configured to play music based upon a specific information requester's URL address use history, which is tracked and stored by the server 130 via metadata database 220. In one embodiment, the URL is altered to be responsive to the tracked metadata. For example, metadata can be analyzed for sound levels in a playable video or webpage and reduce or increase the background music over time. In another embodiment, user profile data and information requester database 232 operate with custom response and notification generator 210 to mute the background music in the playable video or webpage.

In one embodiment, the server 130 via is configured to track and store the number of clicks or uses a particular URL receives via metadata 220. In one embodiment in which the URL address links to a playable video, the server 130 is configured to track and store the amount of time it takes to download the playable video. In another embodiment, the server 130 is configured to track and store the start and stop times for the playable video. In a further embodiment, the server 130 is configured to track and store the start and stop times for specific sequences of the playable video. This data is tracked and stored by the server 130 for predicting an information requester's playable video watching habits. The server 130 is also configured to analyze the data for determining what subject matter a particular information requester is most interested in, as well as particular times of day the information requester is active in accessing various URL address links, or if a information requester is more prone to viewing a webpage or playable video based on a particular design aspect or message. This analysis of data is taken into account when the server 130 is configured to notify information requesters of particular events or when an input command to send a notification is received by the server 130

After a playable video has concluded or the information requester has manually stopped the playable video, the server 130 is configured to display a number of prompts to the information requester. In one embodiment, the prompt is a command to call a sales person associated with the playable video. In another embodiment, the prompt is a command to text a sales person associated with the playable video. In another embodiment, the prompt is a command to determine whether the playable video was relevant to the information requester or not. In another embodiment, the prompt is a command to determine whether the information requester enjoyed the particular subject matter of the playable video. In another embodiment, the prompt is a command to enter a message wherein the information requester can write a review of the playable video, the subject matter, or the experience generally. In another embodiment, the prompt is a command to rank the playable video. In yet another embodiment, the prompt is a command to view more information on the subject matter. In another embodiment, the prompt is a command to replay the playable video. In another embodiment, the prompt is a command to view other subject matter that was recently viewed by the information requester. In yet another embodiment, the prompt is a command to view playable videos, images, messages, or other notifications regarding similar subject matter or events. In yet another embodiment, the prompt is a command to customize the parameters for determining what subject matter the information requester is notified of. In yet another embodiment, the prompt is a command to customize the parameters for receiving notifications generally.

In another embodiment, the prompt is a command to subscribe to future notifications regarding the particular subject matter. In another embodiment, the prompt is a comment to subscribe to future notifications from the particular sales associate associated with the playable video and subject matter. Commanding the server 130 to subscribe the information requester to future notifications from a particular sales associate will enable the information requester to receive custom messages and notifications from the sales associate regarding a variety of subject matter.

In one embodiment, the prompt is a command to download the playable video onto the information requester's device. When a playable video is downloaded, the server 130 is configured to track the download and send an alert to a sales associate associated with the playable video. The server 130 is configured to communicate to the sales associate how much of the playable video was watched. In another embodiment, the server 130 is also configured to communicate to the sales associate what prompts were initiated by the information requester after the playable video concluded. In another embodiment, the server 130 is configured to prompt the sales associate to contact the information requester via email, text, voice call, or any other form of communication.

In another embodiment, the server 130 is configured to create groupings or lists of information requesters based on shared similar custom parameters, such as commercial items or properties interested in, price ranges, or music preferences, or any other parameter. When an information provider is prompted by the server 130 that a information requester has subscribed to that particular information provider/sales associate, the server 130 is configured to receive a command placing the information requester into any of the server 130's groupings or lists for future notifications based on that specific group's or list's custom parameters.

Note that various hardware elements of one or more of the described embodiments are referred to as "modules" that carry out (perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation. Each described module may also include instructions executable for carrying out the one or more functions described as being carried out by the respective module, and those instructions may take the form of or include hardware (or hardwired) instructions, firmware instructions, computer code instructions, and/or the like, and may be stored in any suitable non-transitory computer-readable medium or media, such as commonly referred to as RAM or ROM.

Although features and elements are described above in particular combinations, one of ordinary skill in the art will appreciate that each feature or element may be used alone or in any combination with the other features and elements. In addition, the methods described herein may be implemented in a computer program, computer code, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with computer code may be used to implement a radio frequency transceiver for use in a WTRU, UE, terminal, base station, RNC, or any host computer.

We claim:

1. A system, comprising:
a processor;
a memory comprising computer code that, when executed by the processor, causes the processor to:
receive a first short-message service (SMS) text message from an information requester, wherein the first SMS text message includes a phone number associated with the first SMS text message and a message body, and wherein the first SMS text message indicates a request for information regarding real estate;
based on the phone number associated with the first SMS text message, identify an information provider having a private user profile and private user data stored in a database;
retrieve from the database, using the private user profile, real estate-related information of interest to the information requester and determine, from the retrieved real estate-related information of interest to the information requester, at least one public information source;
extract, from the at least one public information source, at least some publicly-accessible information;
combine (i) one or more of video templates and components pre-stored in the database and (ii) at least some of the extracted publicly-available information so as to create a personalized video for the information requester;
create a publicly-accessible information link to display the personalized video;
combine the publicly-accessible link with a second SMS text message to be sent to the information requester in response to the first SMS text message; and
forward the second SMS text message for receipt by the information requester.

2. The system of claim 1, wherein the database is a dynamic relational database organized with at least one data structure.

3. The system of claim 2, wherein the dynamic relational database hierarchically stores the private user data, the private user data including data related to the information requester and stored by the information provider.

4. The system of claim 2, wherein the data structure provides a controlled access to a hierarchical data component including phone number routing information.

5. The system of claim 2, wherein the dynamic relational database provides access to the private user profile and the private user data via a hierarchical data structure, the hierarchical data structure including a respective identifier associated with each private user profile, the respective identifier enabling storing one or more pre-identified messages.

6. The system of claim 5, wherein the pre-identified messages include messages between the information provider and the information requester identified by the phone number associated with the first SMS text message.

7. The system of claim 1, wherein the computer code, when executed by the processor, further causes the processor to:
determine an access privilege, and as a function of the access privilege, retrieve the real estate-related information of interest to the information requester in combination with one or more pre-identified messages, the one or more pre-identified messages including one or more messages between the information requester and the information provider.

8. The system of claim 1, wherein the real estate-related information of interest to the information requester includes one or more of: property tax data, data identifying listings in a given geographical area, a square footage, a number of bathrooms, a number of bedrooms, a price range of real estate, school data, data related to a criminal activity in a geographical area, data related to recent sales, and data providing an estimate of value of real estate listings.

9. The system of claim 1, wherein the computer code, when executed by the processor, causes the processor to automatically forward the second SMS text message to the information requester.

10. The system of claim 1, wherein the computer code, when executed by the processor, causes the processor to forward the second SMS text message to the information provider, and wherein the information provider subsequently forwards the second SMS text message to the information requester.

11. The system of claim 1, wherein the video templates and components pre-stored in the database include one or more of: animations, an on-camera footage of an individual speaking or performing a particular act, a video footage of a particular commercial item or property, a video footage of a geographical location, a photograph, a series of photographs played in succession, data displayed via text, data displayed via an image or graphics, data displayed via text in association with a video, a background music, an individual speaking a particular phrase, an individual describing something, and an individual offering a greeting.

12. The system of claim 1, wherein the at least some publicly-accessible information includes information about one or more real estate listings.

13. A method for combining private and public data comprising:
   receiving, via a processor, a first short-message service (SMS) text message from an information requester, wherein the first SMS text message includes a phone number associated with the first SMS text message and a message body, and wherein the first SMS text message indicates a request for information regarding real estate;
   based on the phone number associated with the first SMS text message, identifying, via the processor, an information provider having a private user profile and private user data stored in a database;
   retrieving from the database, via the processor, using the private user profile, real estate-related information of interest to the information requester;
   determining from the retrieved real estate-related information of interest to the information requester, via the processor, at least one public information source to access;
   extracting, via the processor, from the at least one public information source, at least some publicly-accessible information;
   combining, via the processor, (i) one or more of video templates and components pre-stored in the database and (ii) at least some of the extracted publicly-accessible information so as to create a personalized video for the information requester;
   creating, via the processor, a publicly-accessible link to display the personalized video;
   combining, via the processor, the publicly-accessible link with a second SMS text message to be sent to the information requester in response to the first SMS text message; and
   forwarding, via the processor, the second SMS text message for receipt by the information requester.

14. The method of claim 13, wherein the database is a relational database that provides a controlled access to a hierarchical data component including phone number routing information.

15. The method of claim 13 further comprising:
   determining, via the processor, an access privilege, and as a function of the access privilege, retrieving the real estate-related information of interest to the information requester.

16. The method of claim 13, wherein the real estate-related information of interest to the information requester includes one or more of: property tax data, data identifying listings in a given geographical area, a square footage, a number of bathrooms, a number of bedrooms, a price range of real estate, school data, data related to a criminal activity in a geographical area, data related to recent sales, and data providing an estimate of value of real estate listings.

17. The method of claim 13, wherein forwarding the second SMS text message for receipt by the information requester includes automatically forwarding the second SMS text message to the information requester.

18. The method of claim 13, wherein forwarding the second SMS text message for receipt by the information requester includes forwarding the second SMS text message to the information provider and the information provider subsequently forwarding the second SMS text message to the information requester.

19. The method of claim 13, wherein the video templates and components pre-stored in the database include one or more of: animations, an on-camera footage of an individual speaking or performing a particular act, a video footage of a particular commercial item or property, a video footage of a geographical location, a photograph, a series of photographs played in succession, data displayed via text, data displayed via an image or graphics, data displayed via text in association with a video, a background music, an individual speaking a particular phrase, an individual describing something, and an individual offering a greeting.

20. The method of claim 13, wherein the at least some publicly-accessible information includes information about one or more real estate listings.

21. A method comprising:
   receiving, via a processor, a first short-message service (SMS) text message from a customer of a real estate agent, wherein the first SMS text message includes a phone number associated with the first SMS text message and a message body, and wherein the first SMS text message indicates a request for information regarding real estate;
   based at least on the phone number associated with the first SMS text message, identifying, via the processor, the real estate agent having a private user profile and private user data stored in a database;
   determining, via the processor, based on information associated with the private user profile and retrieved from the database, at least one public information source to access;
   extracting, via the processor, from the at least one public information source, at least some publicly-accessible information, the at least some publicly-accessible information including information about one or more real estate listings;
   combining, via the processor, (i) one or more of video templates and components pre-stored in the database and (ii) at least some of the extracted publicly-accessible information so as to create a personalized video for the customer of the real estate agent;

creating, via the processor, a publicly-accessible link to display the personalized video;

combining, via the processor, the publicly-accessible link with a second SMS text message to be sent to the customer of the real estate agent in response to the first SMS text message; and automatically sending, via the processor, the second SMS text message to the customer of the real estate agent.

22. The method of claim 21, wherein the video templates and components pre-stored in the database include one or more of: animations, an on-camera footage of an individual speaking or performing a particular act, a video footage of a particular commercial item or property, a video footage of a geographical location, a photograph, a series of photographs played in succession, data displayed via text, data displayed via an image or graphics, data displayed via text in association with a video, a background music, an individual speaking a particular phrase, an individual describing something, and an individual offering a greeting.

* * * * *